(12) United States Patent
Maier

(10) Patent No.: US 6,575,672 B1
(45) Date of Patent: Jun. 10, 2003

(54) SUPERFINISHING TOOL

(75) Inventor: Andreas Maier, Schwendi-Hörenhausen (DE)

(73) Assignee: Hartmetallwerkzeugfabrik Andreas Maier GmbH, Schwendi-Horenhausen (DE)

( * ) Notice: Subject to any disclaimer, the term of this patent is extended or adjusted under 35 U.S.C. 154(b) by 0 days.

(21) Appl. No.: 09/423,309

(22) PCT Filed: May 12, 1998

(86) PCT No.: PCT/DE98/01331

§ 371 (c)(1),
(2), (4) Date: Nov. 12, 1999

(87) PCT Pub. No.: WO98/51439

PCT Pub. Date: Nov. 19, 1998

(30) Foreign Application Priority Data

May 12, 1997 (DE) .......................... 197 19 892

(51) Int. Cl.[7] .......................... B23D 77/10; B23B 51/06
(52) U.S. Cl. .......................... 408/59; 408/171
(58) Field of Search .............. 408/161, 168, 408/171, 83, 57, 59

(56) References Cited

U.S. PATENT DOCUMENTS

| 53,996 | A | * | 4/1866 | Loomis | 408/168 |
|---|---|---|---|---|---|
| 1,074,820 | A | * | 10/1913 | Schellenbach | 408/171 |
| 1,512,339 | A | * | 10/1924 | Johnson et al. | 408/171 |
| 1,745,660 | A | * | 2/1930 | Denning | 408/171 |
| 3,511,120 | A | * | 5/1970 | Kaser | 408/59 |
| 4,050,840 | A | * | 9/1977 | Skingle | 408/161 |
| 4,212,569 | A | * | 7/1980 | Andersson et al. | 408/59 |
| 4,606,680 | A | * | 8/1986 | Striegl | 408/59 |
| 4,705,435 | A | | 11/1987 | Christoffel | |

FOREIGN PATENT DOCUMENTS

| CH | 645051 | 9/1984 |
|---|---|---|
| DE | 2237743 | 2/1974 |
| DE | 4128028 | 2/1993 |
| DE | 4441648 | 5/1996 |
| EP | 0215144 | 3/1987 |
| FR | 2460173 | 1/1981 |

* cited by examiner

Primary Examiner—Steven C. Bishop
(74) Attorney, Agent, or Firm—Dennison, Schultz & Dougherty

(57) ABSTRACT

The invention relates to a superfinishing tool having a shank (2), as well as at least one rigid cutting edge (16) and at least one guide rib (30) on the periphery. In addition, or alternatively, the cutting edge (16) and/or the guide rib(s) (30) can be configured to form a single-piece solid tool with the shank (2). The guide beads or ribs guarantee steady, stable functioning of the tool in spite of high rotational speed and/or hardness of the workpiece. An additional advantage is provided by producing the tool as a solid tool, i.e. made of solid hard metal.

9 Claims, 25 Drawing Sheets

SUPERFINISHING TOOL

Figure 1A:
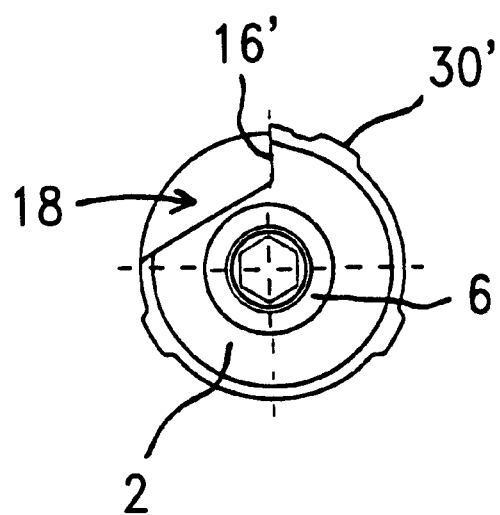

The invention relates to a microfinishing tool comprising a shank, at least one rigid cutter, as well as at least one guide rib on the periphery and a taper screw by means of which the cutting diameter can be adjusted.

Such tools are used especially as reamers.

From CH-PS 449390 there is known a reamer supplied with coolant whose tool body is provided with a central longitudinal bore leading to the cutting head, and from which longitudinal bore a plurality of transverse bores extend outwardly at an angle between the cutters. Coolant and lubricant is supplied through these bores in order to cool and to lubricate the cutting head during the cutting process.

In a reamer having an adjustable cutting head, described in DE 32 34 238 A, the reamer is provided with a central coolant bore which divides into two diverging branch bores skirting the shank of the taper screw at a shallow angle. The taper extends only over the forward cutting region, so that upon adjustment only the forward portion of the reamer is expanded.

According to EP 0215144B, a reamer is provided with a cutting head expansible by a taper screw and with a coolant passage leading axially through the reamer shaft, with the coolant passage extending into a threaded bore receiving the threaded shank of the taper screw and subsequent to this passing into a hollow cylindrical part of the reamer shaft which is expansible by the taper screw. Between the hollow cylindrical shaft portion and the taper screw there is an annular channel which is connected with the axial coolant passage by means of an axially parallel coolant passage in the taper screw. From the annular passage leads at least one channel between the cutters, with this channel or channels being directed forwards at an angle of between 30° and 45°.

CH-PS 645 051 describes an adjustable machine reamer with taper screw which comprises adjustment means for changing the spacing of the cutters and the guide ribs from the reamer axis in the same sense and to approximately the same degree. Again, the adjustment taper extends only over the forward cutting region.

It is the object of the invention to provide a microfinishing tool which is versatile in use, cuts with a high degree of accuracy and can be manufactured economically.

This object is achieved in accordance with the invention by a microfinishing tool as defined herein.

In FR 2460173A there is described a microfinishing tool which has an expandable taper insert which is longer than the cutter. The taper insert is seated in an axial blind bore of the tool shank and has a cylindrical recess in its front end. A radial slot extends from the front end approximately up to the level of the end of the blind bore. Between the cutter and the radial slot there is located a radial screw which is in contact with the taper insert. By rotating the screw one can cause a local asymmetric deformation of the shank, which is weakened in terms of material at this point, and consequently effects a change in the cutting diameter. This arrangement makes possible only a local diameter adjustment and necessitates additional finishing measures and parts. Moreover, it is only suitable for a cutter where the adjustable cutting region is only short.

It is the object of the invention to provide a mircofinishing tool which is versatile in use, cuts with a high degree of accuracy and can be manufactured economically.

A microfinishing tool in accordance with the invention thus comprises a shank, at least one rigid cutter, at least one guide rib on the periphery and a taper screw by means of which the cutting diameter can be adjusted. The taper region of the taper screw is at least equal in length to the cutter.

The term "taper screw" used herein should be understood to include all other expansion parts and arrangements with varying diameter which will achieve the desired expansion effect. By extending the length of the taper and of the taper region one achieves an enlargement of the expansion zone. Consequently, the cutters and/or guide ribs can be expanded parallel to the axis, ie. their orientation to the axis remains unchanged and the tapering of the microfinishing tool is maintained. Because the tapering remains the same in spite of changes in diameter, one achieves an unvaryingly good surface quality with the tool.

Preferably, recesses are provided in the shank of suitable shape to serve as expansion aids in the adjustment of the cutting diameter.

Because of the guide ribs the microfinishing tool has a quiet, stable mode of operation in spite of high speeds of rotation and/or hardness of the workpiece, over its whole diameter range. Preferably, with the microfinishing tool of the present invention, at least one guide rib is provided per cutter. Additionally, a guide rib can be arranged axially offset in relation to the associated cutter.

The cutter and/or at least one guide rib can be made as one piece with the shank as a solid tool. The manufacture of the tool as a solid tool is very advantageous, particularly in solid hard metal. The cutters and/or guide ribs can be inserted, or alternatively the cutters can be soldered on.

The different pressure points of the taper screw make it possible to adjust the cutters and guide ribs in a defined way. Depending upon the lengths of the cutters and guide ribs the pressure points can be located at different diameters and axial positions of the taper screws and thus a desired axial region of the cutters or guide ribs.

The material of the cutters and guide ribs can be chosen so as to be matched to the particular requirements of use, independently of the tool body. For example, guide ribs with minimum lubrication and for high speeds of rotation are preferably made of diamond.

A variation of the taper screw comprises tapered sections having different angles of taper. In this way, the enlargement of the diameter can be effected in steps. The taper screw can alternatively be made as a multi-part component.

In one preferred embodiment of the microfinishing tool in accordance with the invention the taper screw includes a cylindrical section after the threaded region, with this cylindrical section being a snug fit in the shank of the tool. This effects a guidance and alignment of the taper screw and consequently gives an extraordinarily precise, centered expansion of the cutting region, if wanted.

The microfinishing tool according to the invention can be provided with internal cooling for coolant and/or lubricant, which is guided in particular to the cutting zone.

This internal cooling is provided for example as a central axial coolant bore in the tool shank for coolant and/or lubricant. From the central axial coolant bore, at least one branch bore leads outwardly into its forward region. In one embodiment of the internal cooling, the branch bore leads into a coaxial supply bore which extends axially at least partially over the cutting region and from which at least one discharge bore leads to the cutting region. The use of coolant and lubricant having 10% or more of an oil-containing emulsion is particularly suitable.

With the structure of the microfinishing tool in accordance with the invention, coolant and lubricant can be supplied to the cutting zone even if the tool shank has been expanded for example by a taper screw or if several cutters or adjustable cutters are provided. The bore which carries the coolant and lubricant runs through into the forward or cutting region either through a possibly provided taper screw or its receiving passage, so that there is no weakening of the material at this position. Rather, the bore extends coaxially into the cutting region and then in the radial direction in the region of the cutters and guide ribs which are to be cooled or to be lubricated. By the simple channel design, the bore geometry is very simple and consequently can be effected at low cost for the most varied types of friction, sinking and boring tools, even without taper screws. In addition to this, the cooling effect of the coaxial bore feeding the coolant through the tool shank can also be utilised.

In particular, the bore arrangement of the present invention makes it possible to cool and to lubricate even the guide ribs of such a tool, so that one ensures a smooth and trouble-free operation of the tool. Preferably, a discharge bore is associated with each guide rib. The coolant and lubricant can be supplied as desired, and the intermediate spaces between the guide ribs can be cleaned effectively of any remaining chip material, etc.

Preferably, the coaxial supply bore extends over the whole length of the cutting region. In this way, the coolant and lubricant are distributed over the whole cutting region and are supplied to the cutters or guide ribs at desired positions by way of the discharge bores.

A particularly good cooling and lubricating effect is achieved in the microfinishing tool according to the invention if a plurality of axially offset discharge bores are provided. The number and axial arrangement of the discharge bores can be chosen according to the mechanical and thermal load of the cutting region which is anticipated.

Preferably, the discharge bore issues into the chip space of an associated cutter. In this way, the coolant and lubricant goes directly to the cutter to be cooled and the chip material can be freed and carried away.

In one advantageous embodiment of the microfinishing tool according to the invention, the discharge bore associated with the guide rib leads outwards in the direction of rotation in advance of the guide rib, i.e. the coolant and lubricant goes directly to the associated guide rib.

Preferably, the branch bore is directed at an angle forwards. The coolant and lubricant stream can thus be directed to the cutting tip in a particularly simple manner.

In one embodiment of the microfinishing tool according to the invention, the branch bore and/or discharge bore associated with the guide rib has a smaller diameter than the bore associated with the cutter. In this way the cutter, which is subject to mechanically higher loads, is supplied with more coolant than the guide rib.

The microfinishing tool in accordance with the invention can be provided with one or more rigid cutters. It can also have one or more replaceable cutters and/or cutters mounted on a carrier. The cutter or cutters can be adjustable, i.e. it or they can be provided with a pre-cutting step.

In addition to one or more cutters provided at the periphery, an end cutter or an end cutting zone can be provided.

The taper screw can close off the axial coolant channel by its threaded end. This simplifies the manufacture of the tool, because the central bore for the cooling channel is then bored through right up to the tapered bore.

A matching to different cutter and guide rib shapes can advantageously be achieved if the taper screw has taper sections with different angles of taper. The cutters and guide ribs can be adjusted thus defined.

If the microfinishing tool according to the invention is provided with internal cooling, the axial coolant bore can issue into a distribution ring which is in front of the end of the taper screw opposite to the tip of the tool, and from which distribution ring the branch bores extend.

Suitable materials for the cutters of the microfinishing tool according to the invention are for example hard metal, cermet, ceramic, polycrystalline, natural or synthetic diamond, as thin film and thick film, or cubic boron nitride.

The guide ribs can consist of for example hard metal, cermet, ceramic, polycrystalline, natural or synthetic diamond, with or without coating.

In the microfinishing tool according to the invention one can arrange for the cutting head to be replaceable. In this way the tool can be utilised in a very versatile manner.

In one preferred embodiment of the invention the cutting head is fixed to the shank of the tool by means of a bayonet connection, or alternatively by means of a taper screw. Obviously, other adaptor connections are also possible.

The microfinishing tool according to the invention can have one, two, three or more cutters.

Preferably, at least one guide rib per cutter is provided. In one embodiment of a sinking and friction cutting tool, two guide ribs per cutter are provided.

The guide ribs are preferably provided between the cutters at the periphery. However, alternatively, a guide rib can be arranged axially offset relative to the associated cutter. In this way, the number of guide ribs per cutter and the desired guiding effect can be maintained in spite of greater numbers of cutters, and so a quiet, stable operation of the tool can be guaranteed in spite of high speeds of rotation and/or workpieces which are very hard.

Figure 1B:
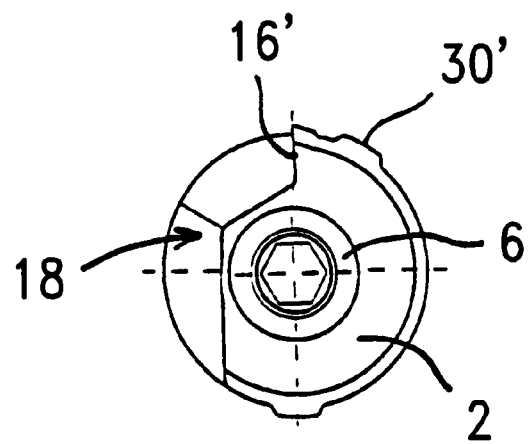
Figure 2A:
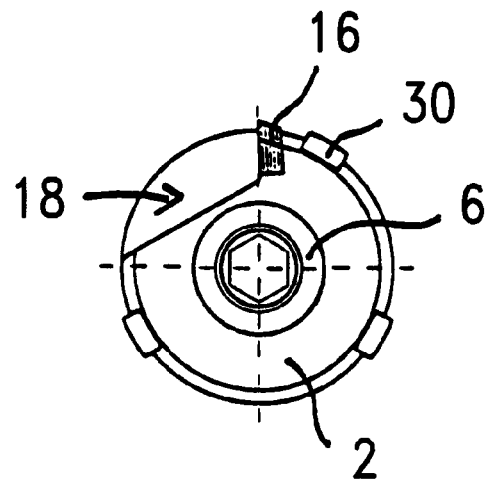
Figure 2B:
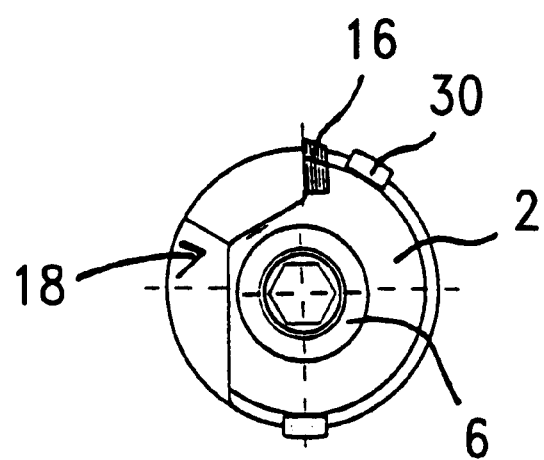
Figure 3A:
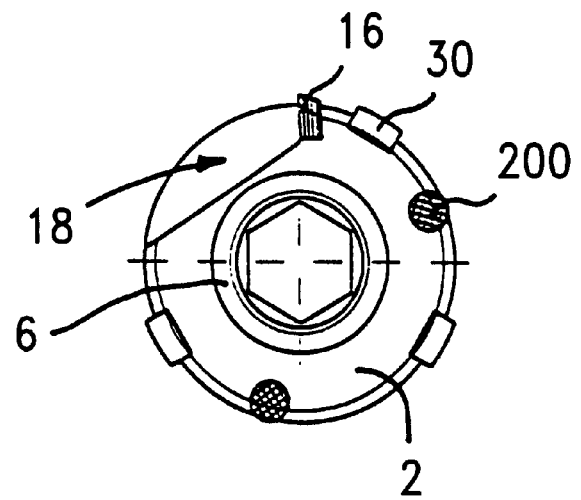
Figure 3B:
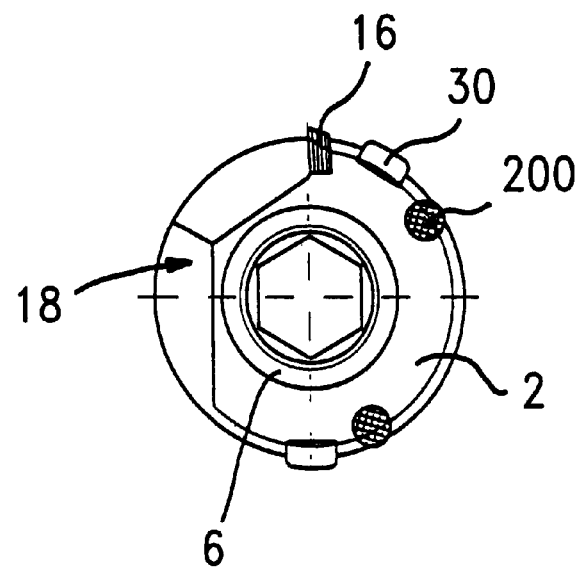
Figure 4A:
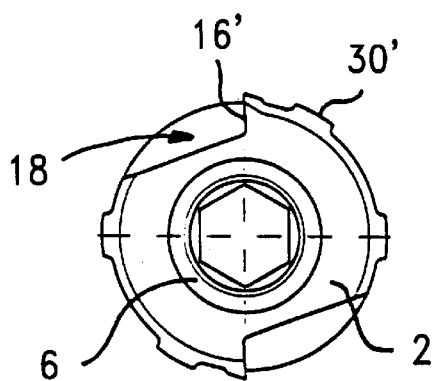
Figure 4B:
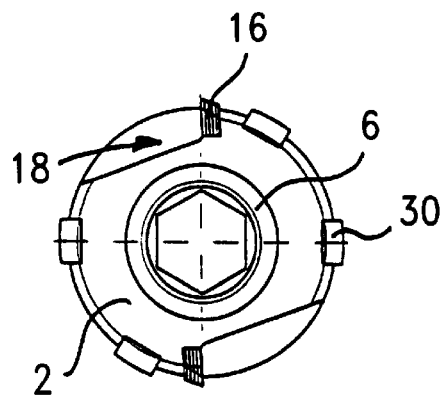
Figure 4C:
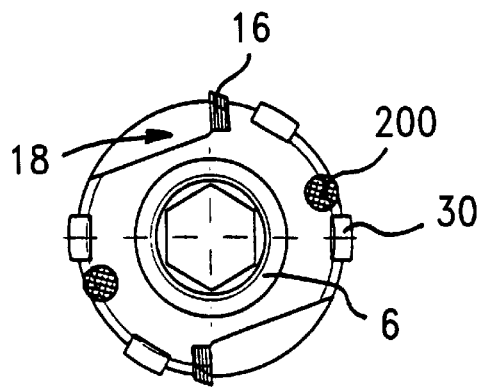
Figure 5A:
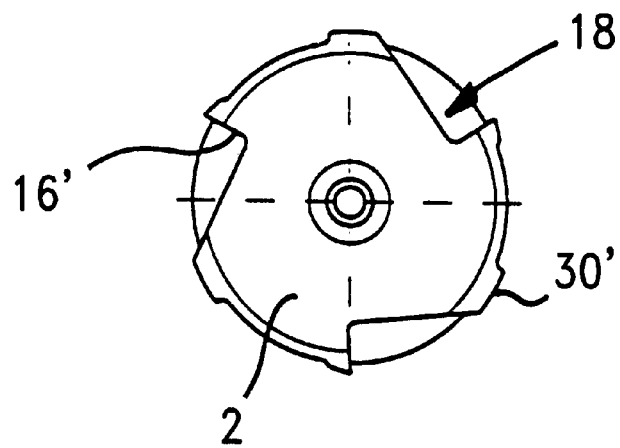
Figure 5B:
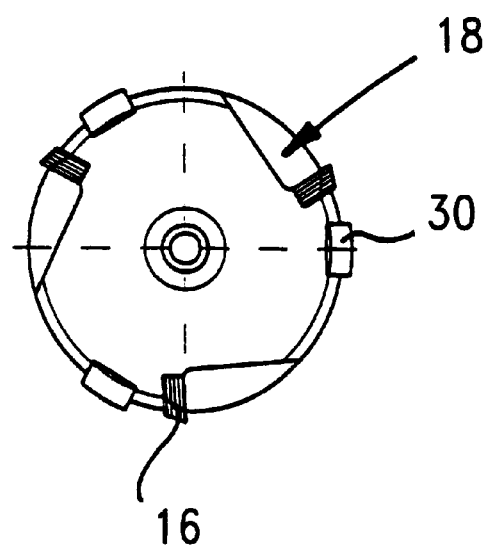
Figure 5C:
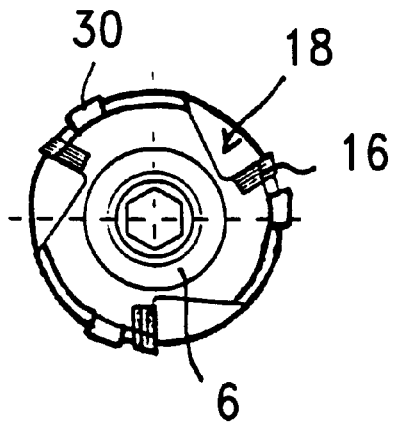
Figure 5D:
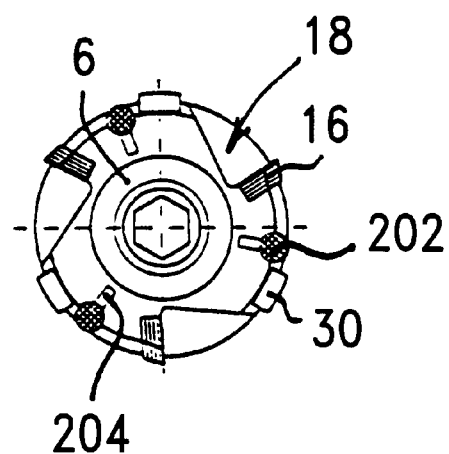
Figure 6A:
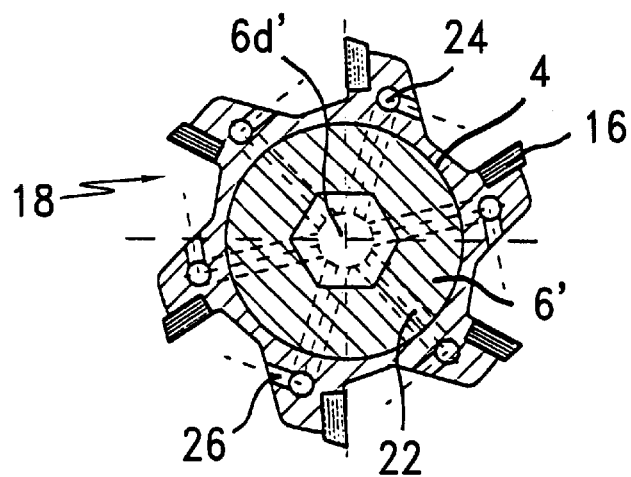
Figure 6B:
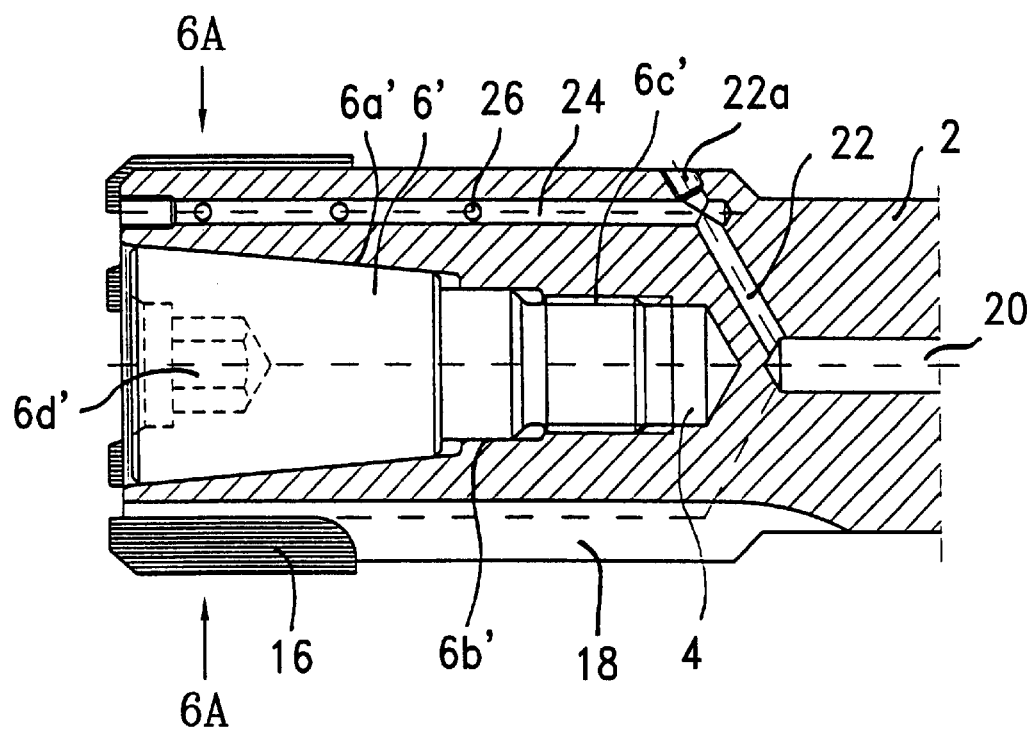
Figure 7A:
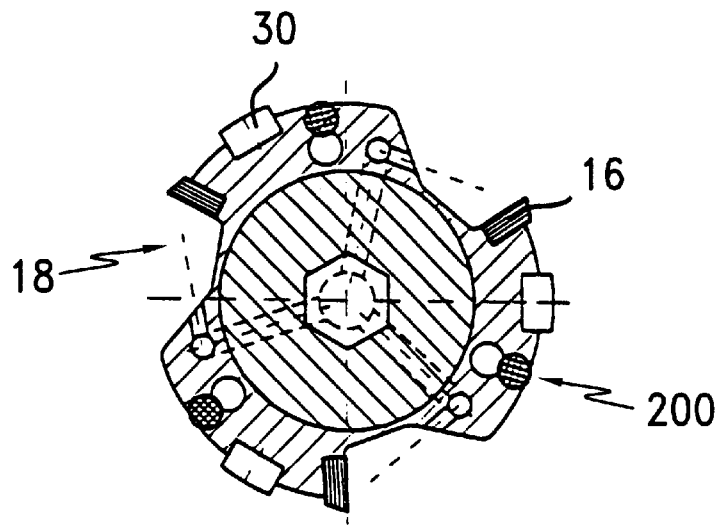
Figure 7B:
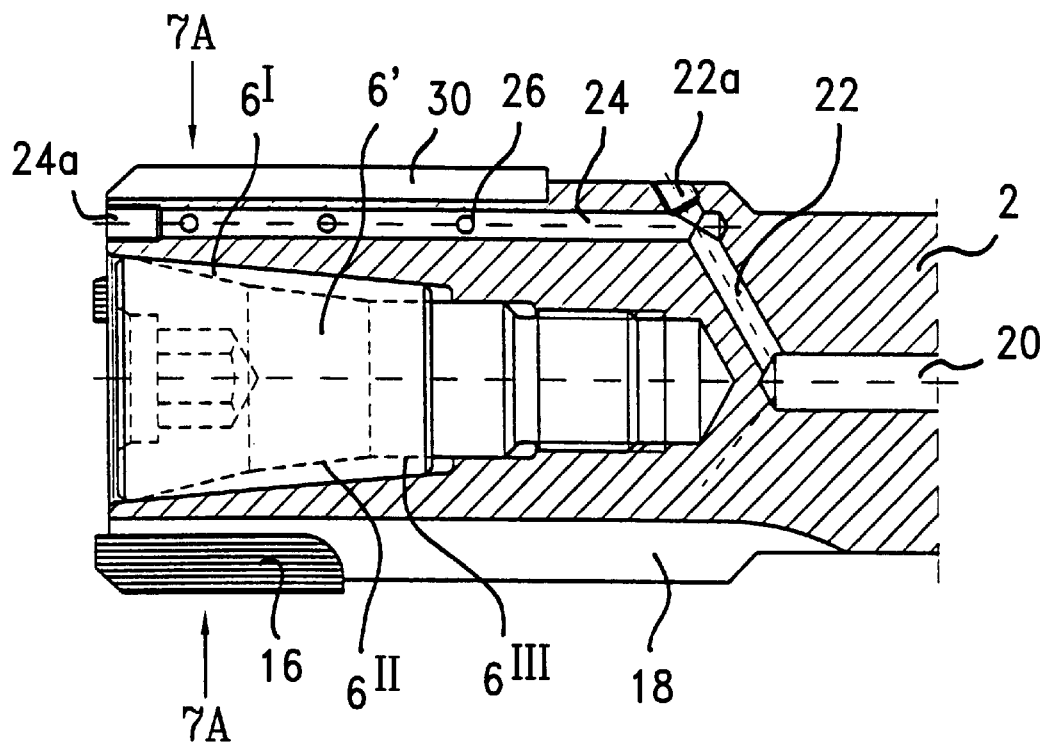
Figure 8A:
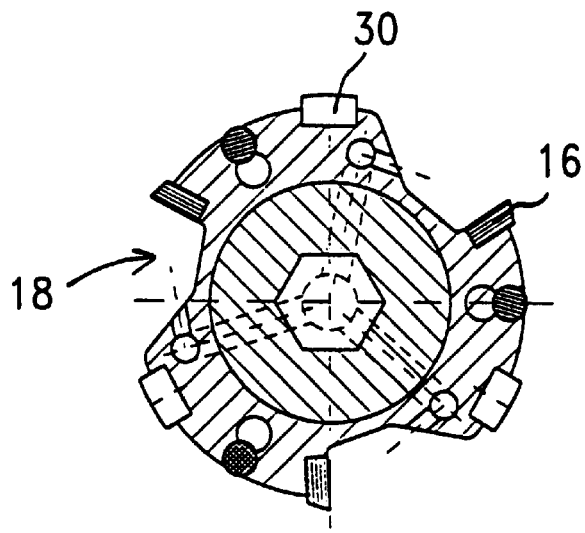
Figure 8B:
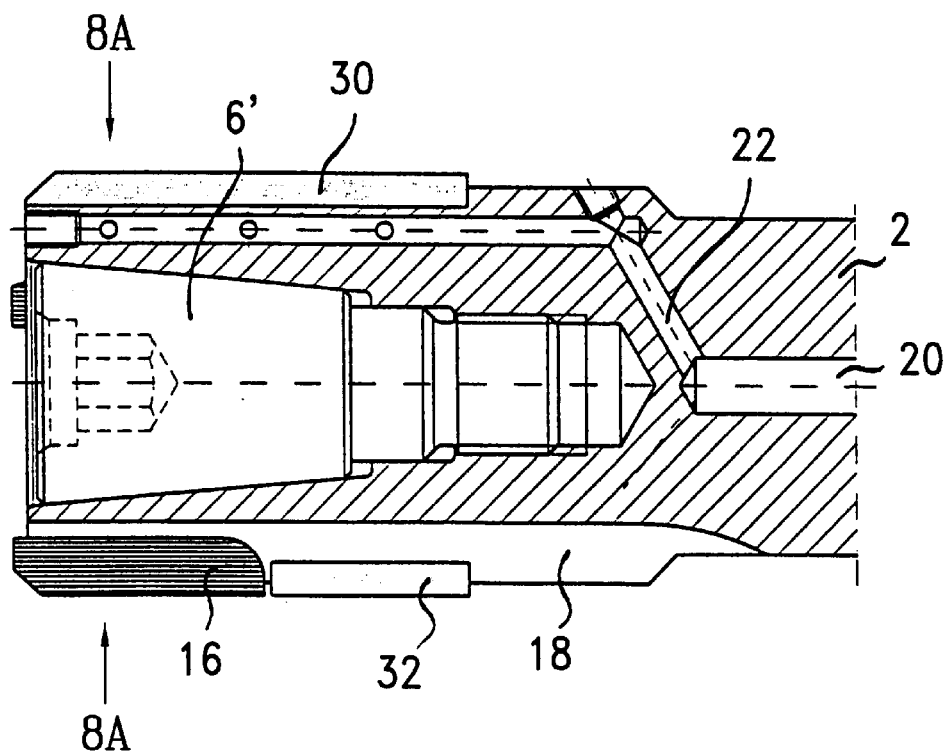
Figure 10:
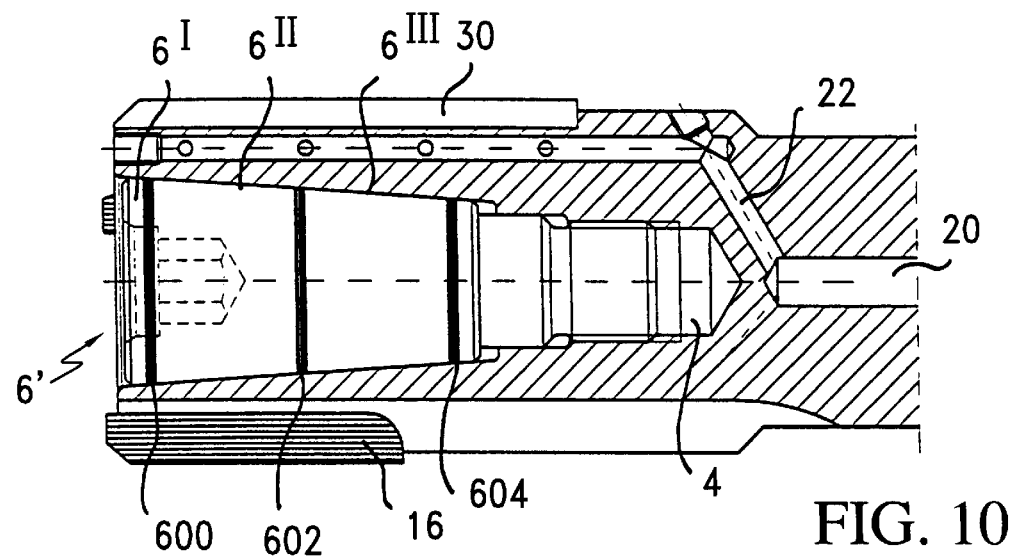
Figure 11:
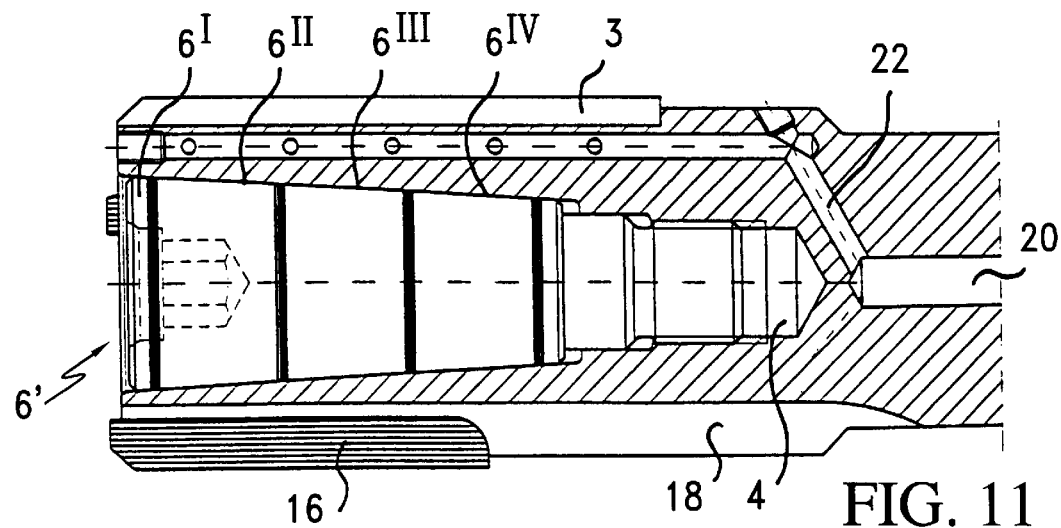
Figure 12A:
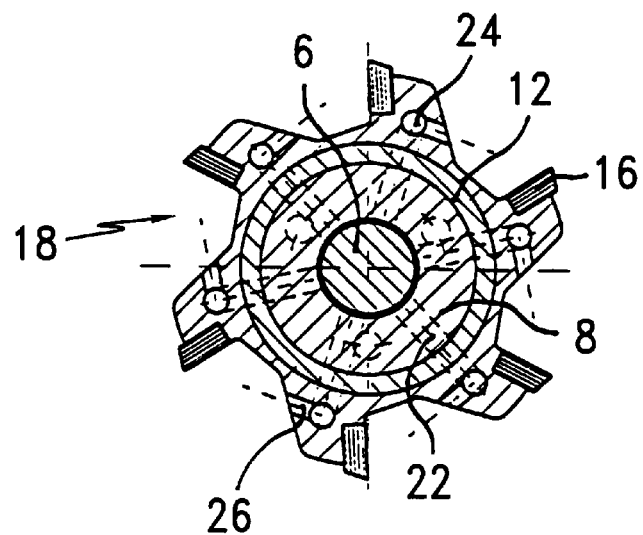
Figure 12B:
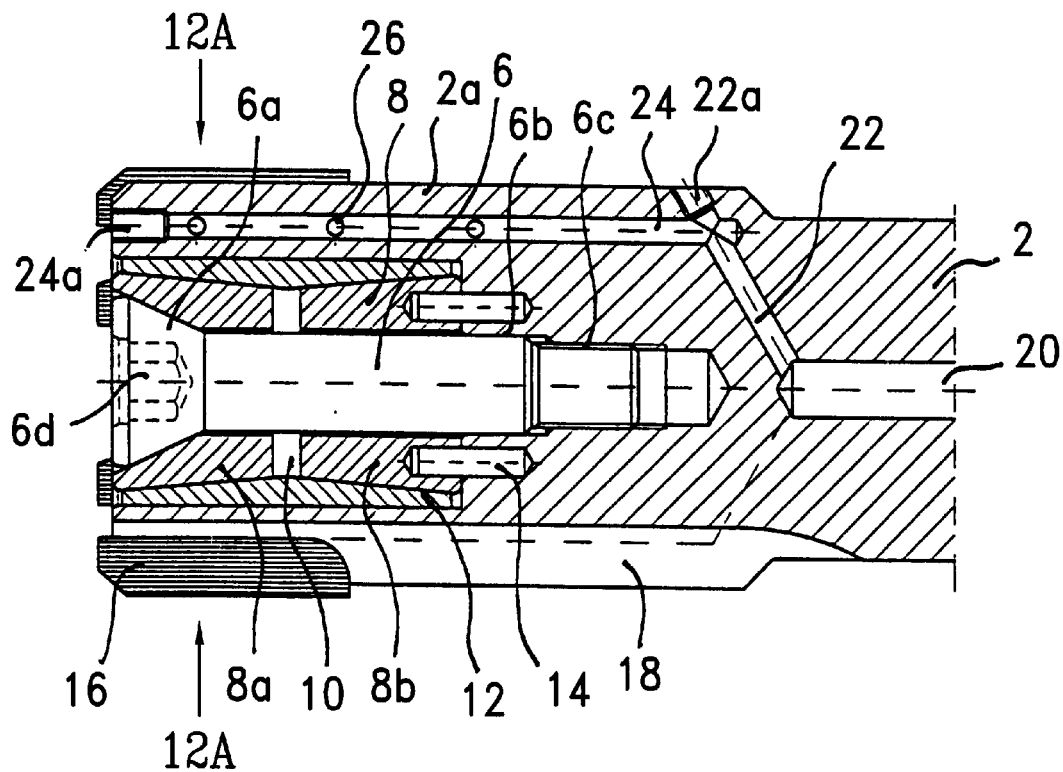
Figure 13A:
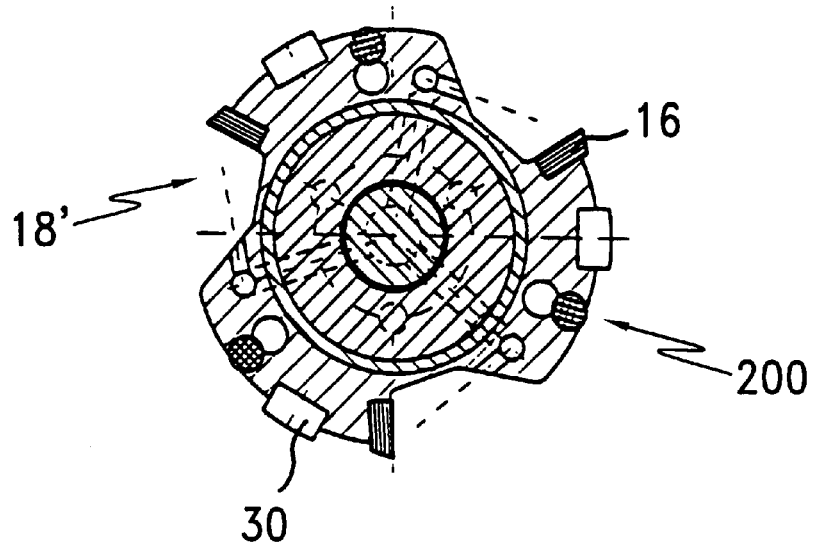
Figure 13B:
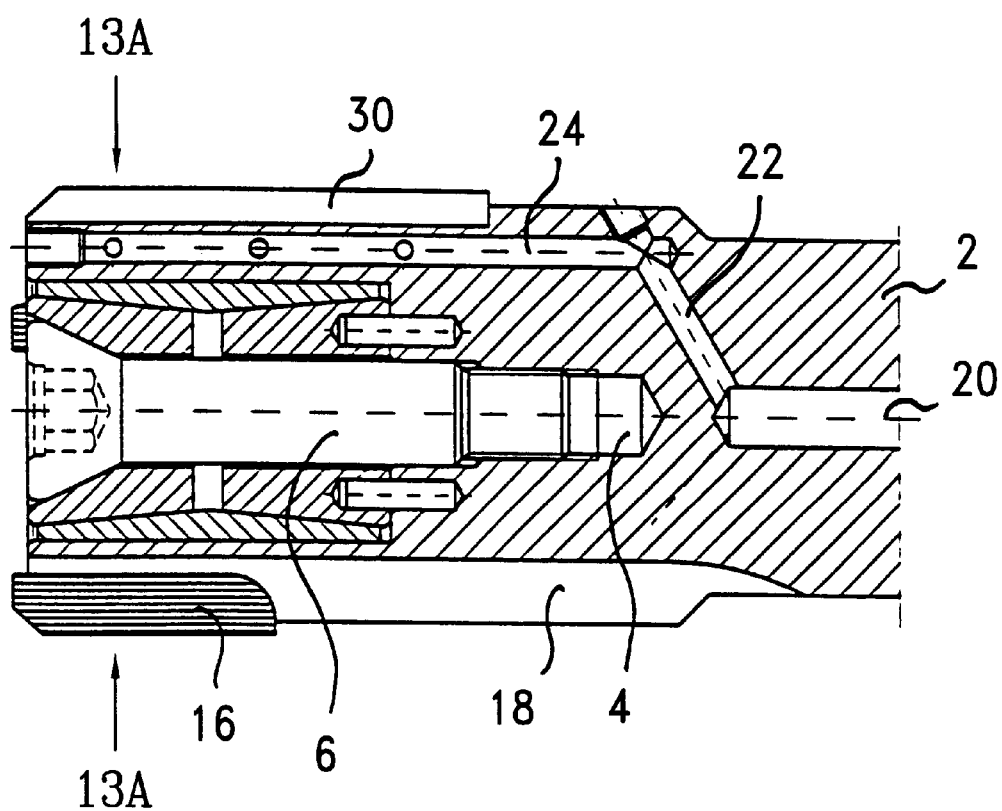
Figure 14A:
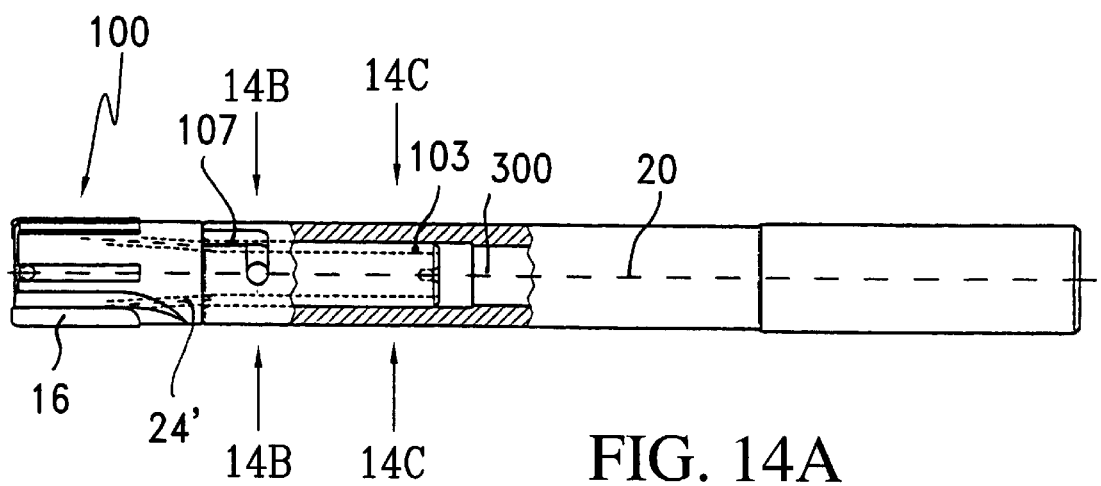
Figure 14B:
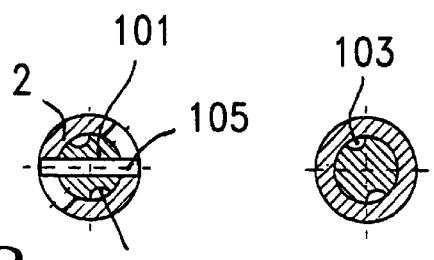
Figure 14C:
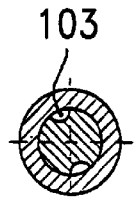
Figure 15:
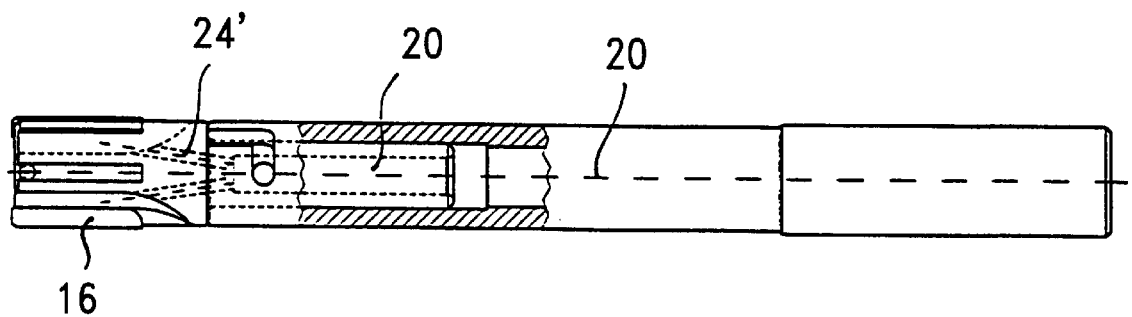
Figure 16A:
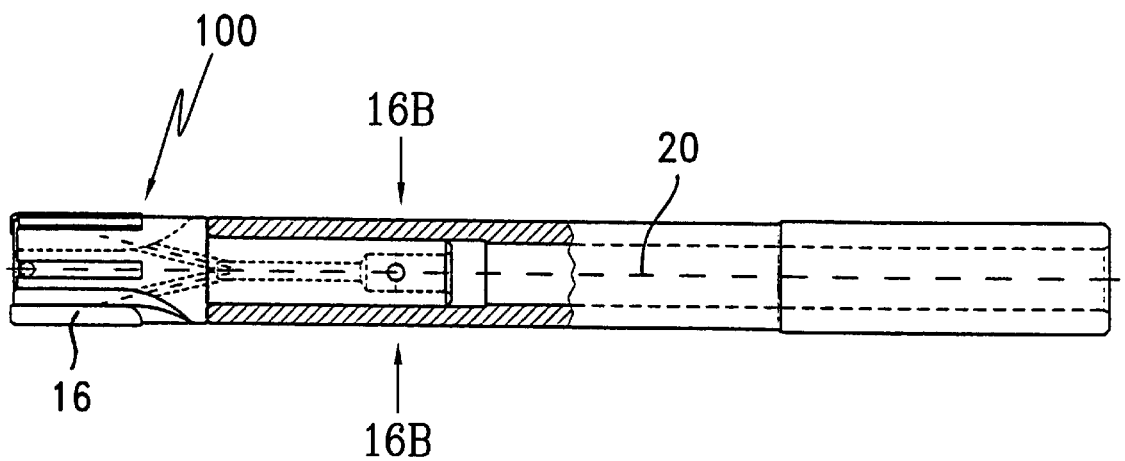
Figure 16B:
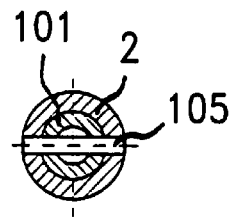
Figure 17A:
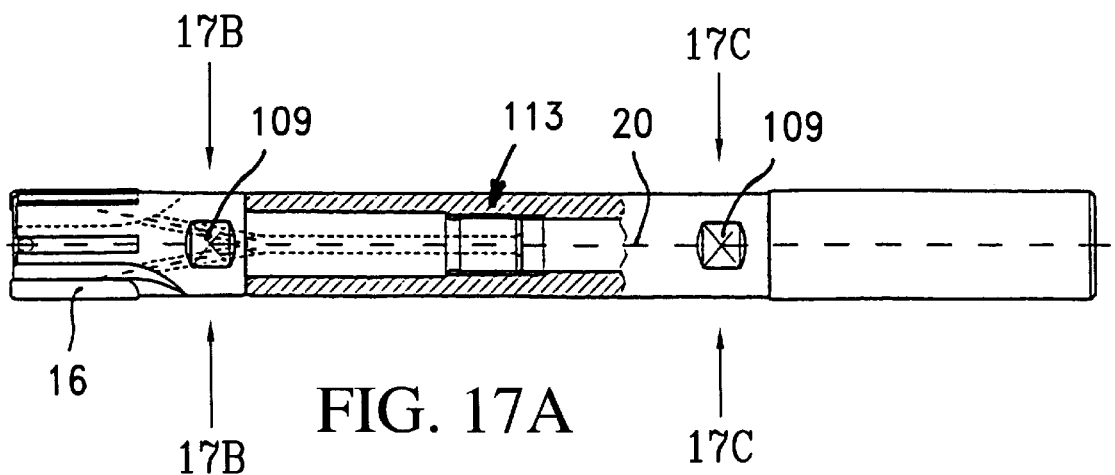
Figures 17B, 17C:
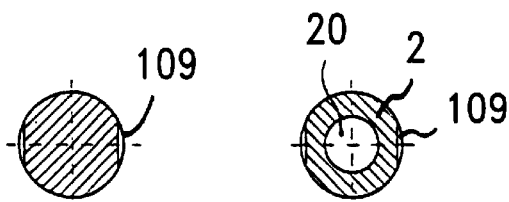
Figure 18A:
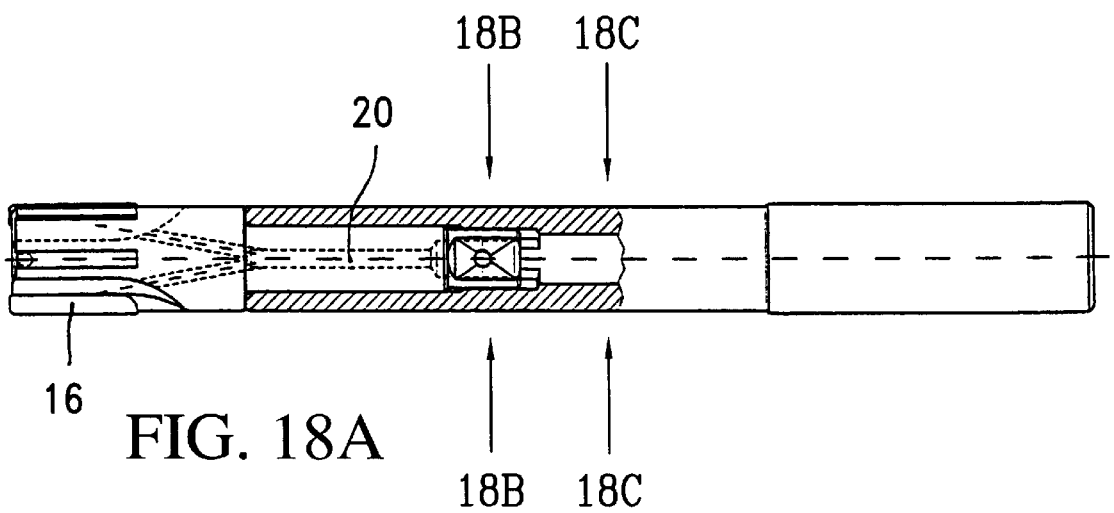
Figure 18B:
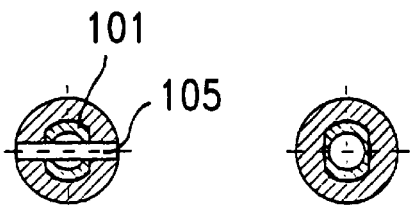
Figure 18C:
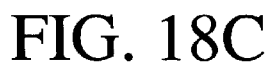
Figure 19:
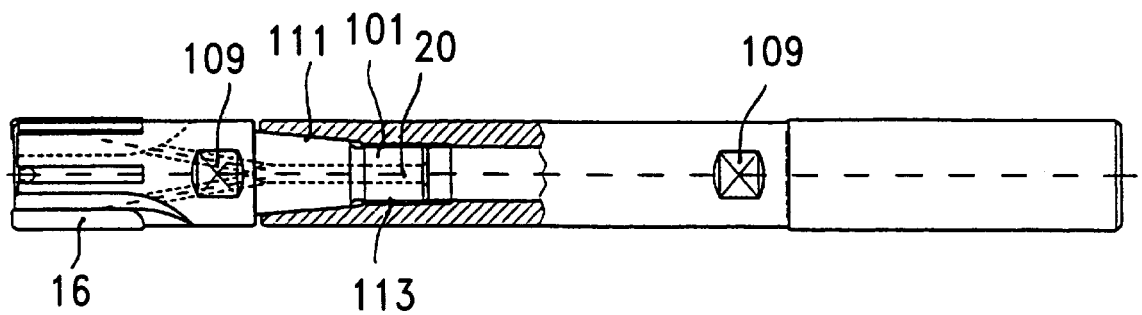
Figure 20A:
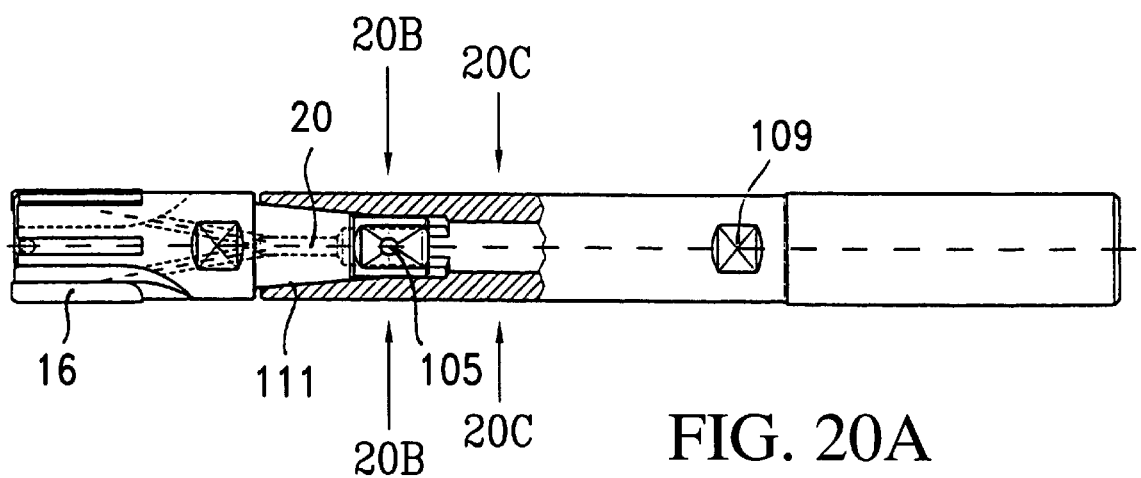
Figures 20B, 20C:
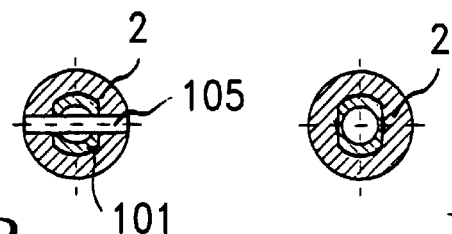
Figure 21A:
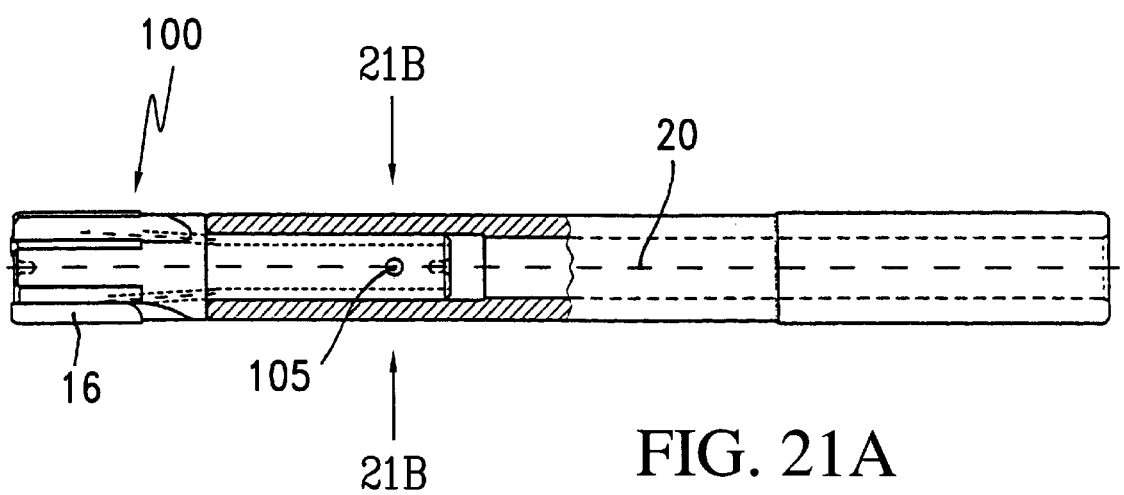
Figure 21B:
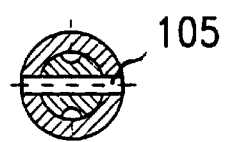
Figure 22:
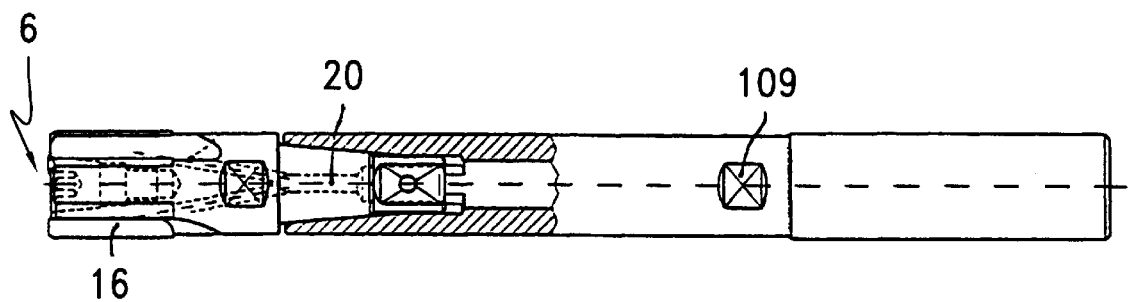
Figure 23A:
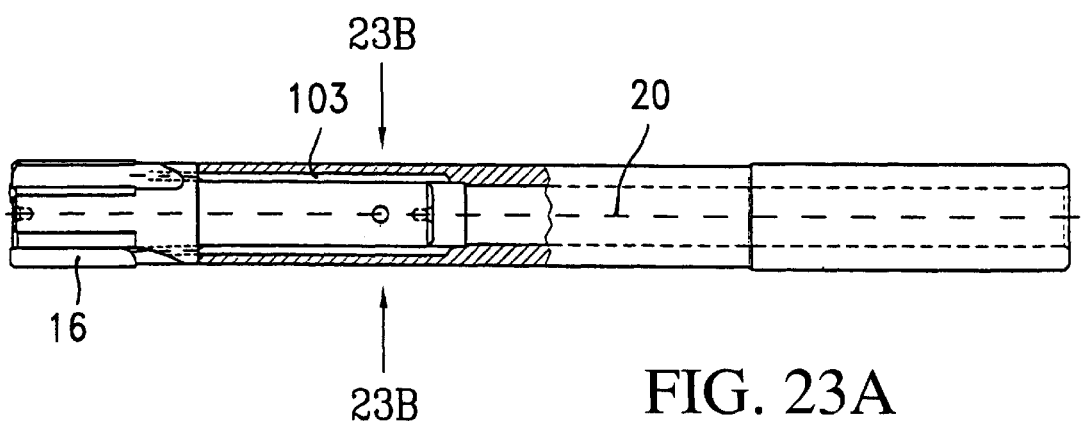
Figure 23B:
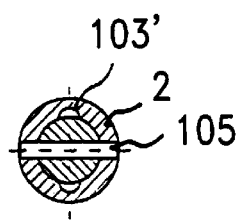
Figure 24A:
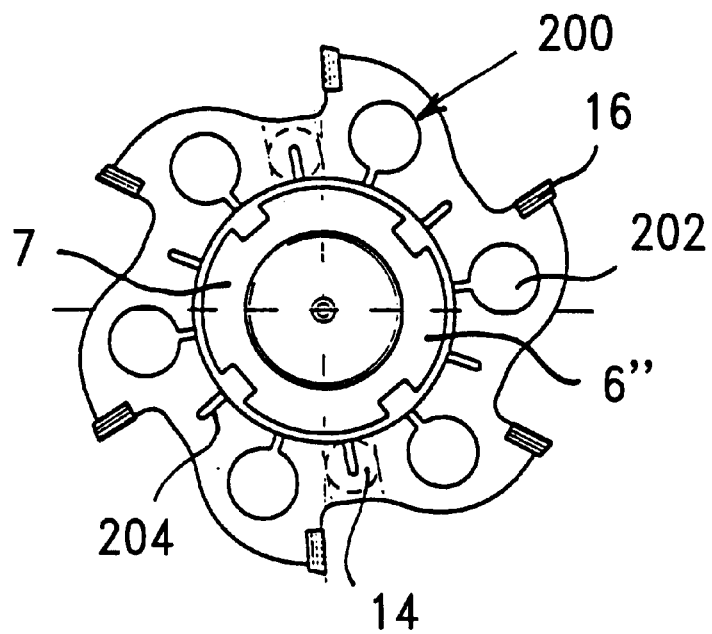
Figure 24B:
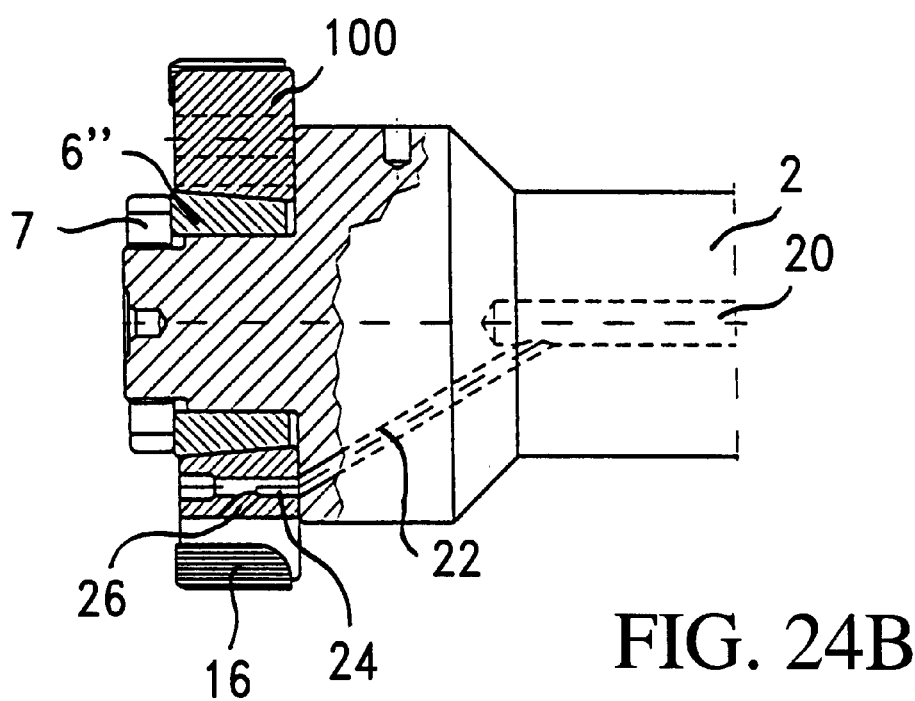
Figure 25:
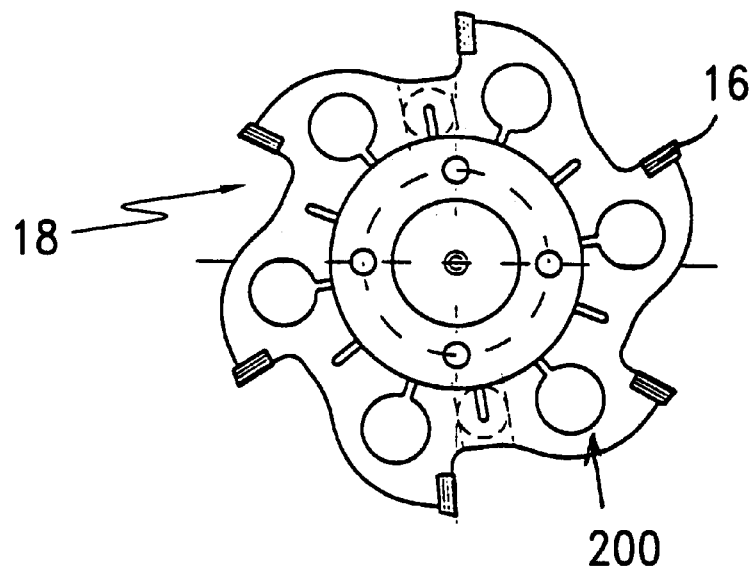
Figure 26:
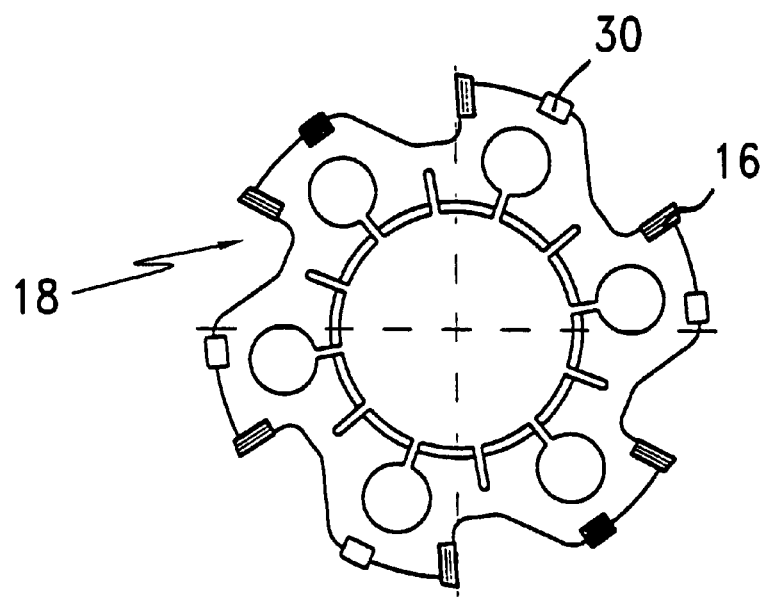
Figure 27A:
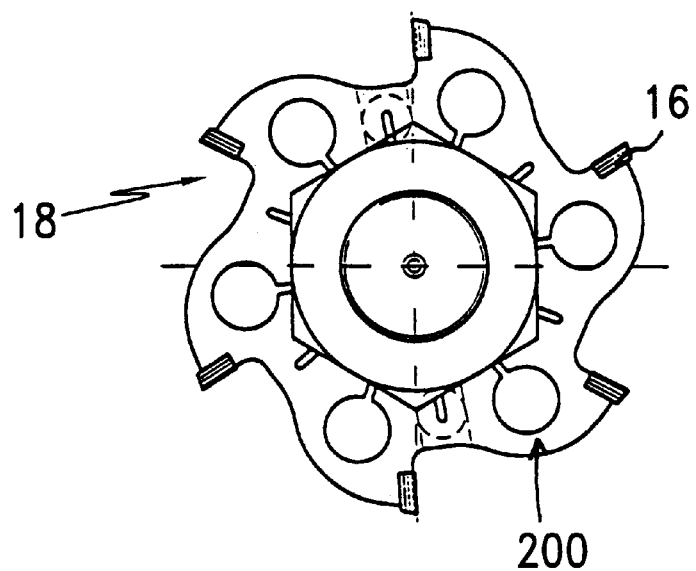
Figure 27B:
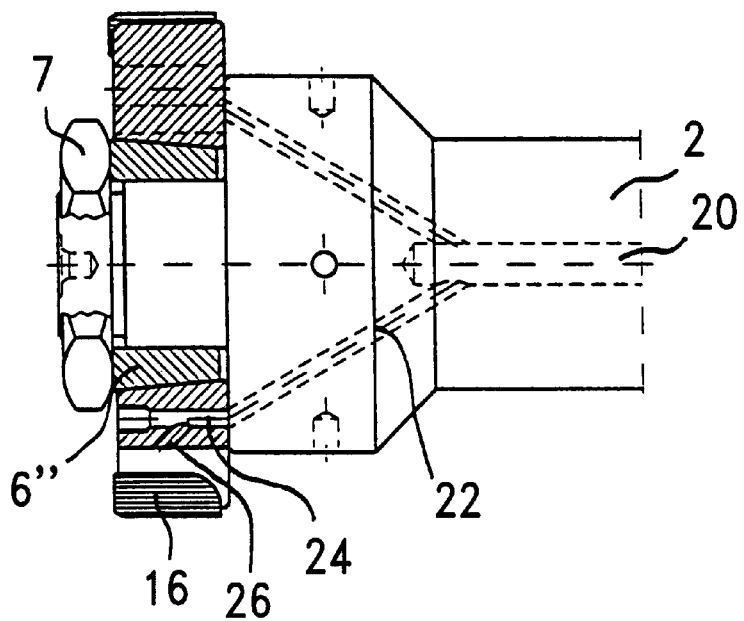
Figure 28A:
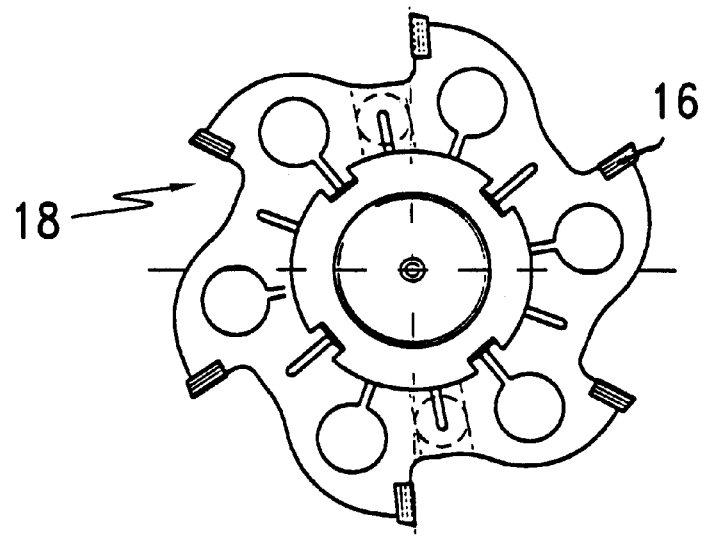
Figure 28B:
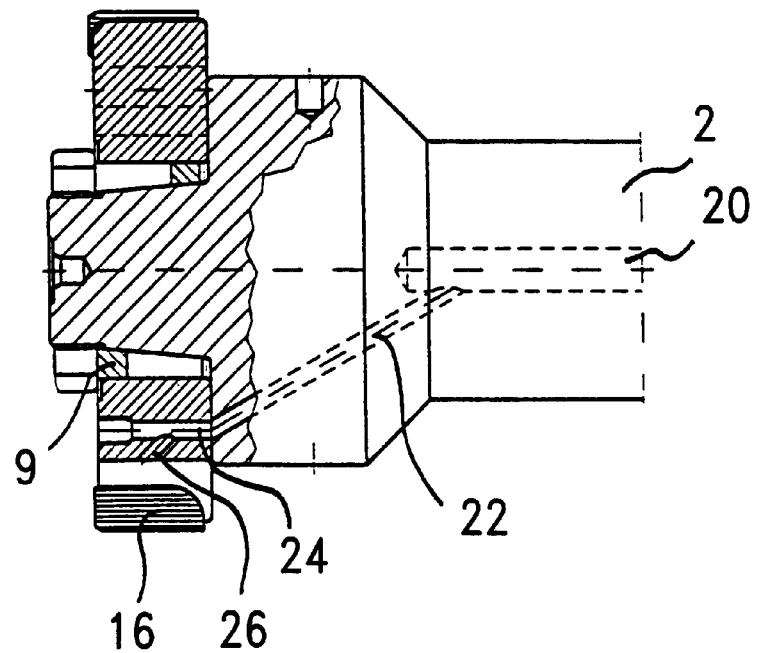
Figure 29:
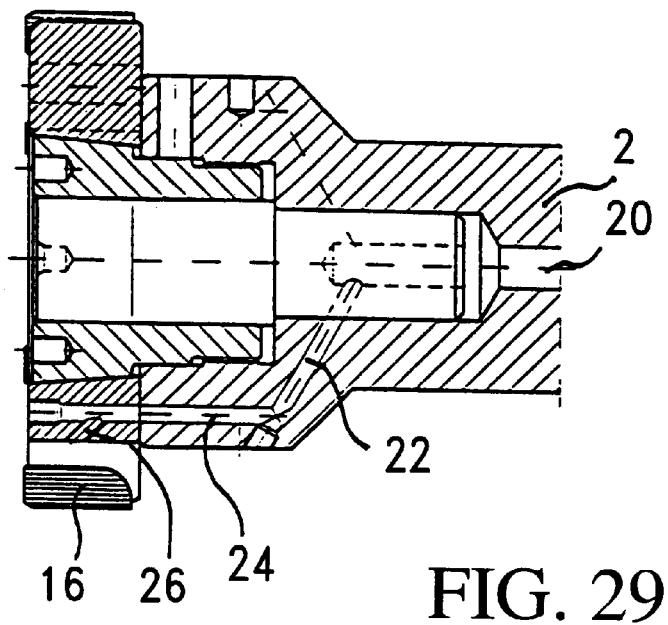
Figure 30:
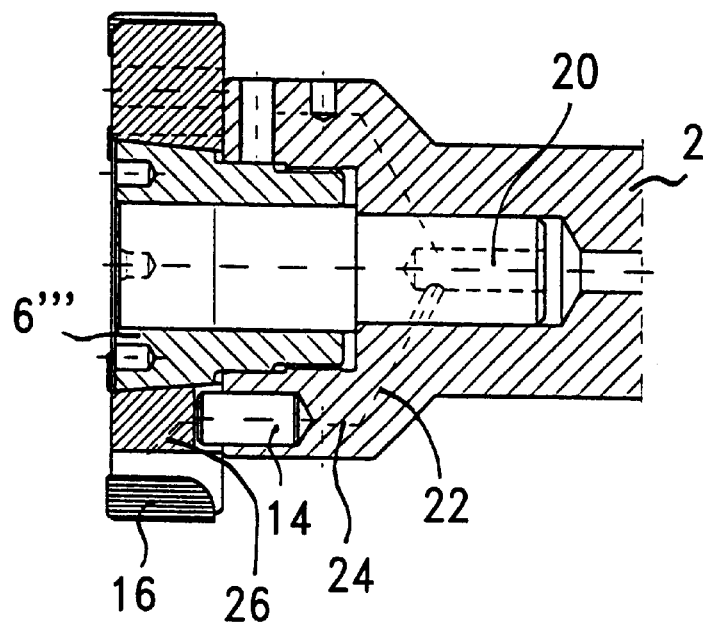
Figure 31:
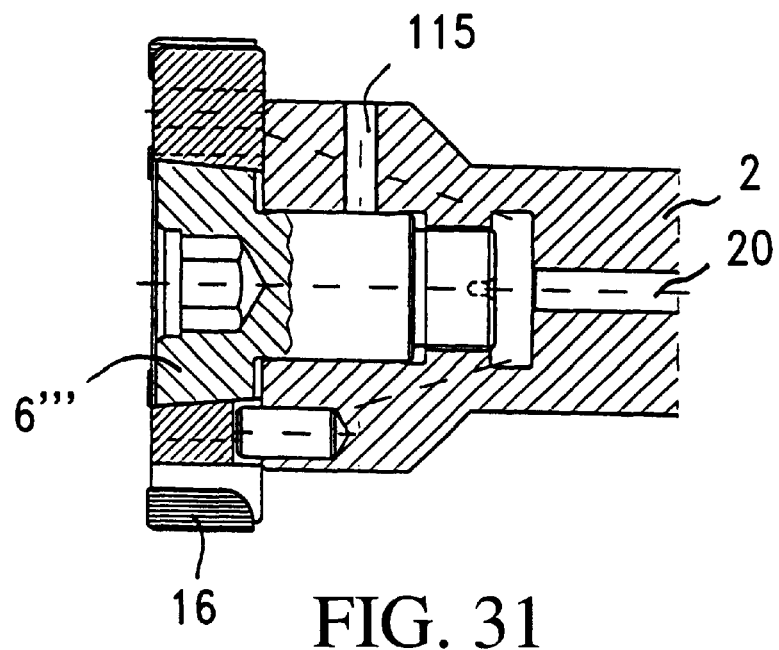
Figure 32:
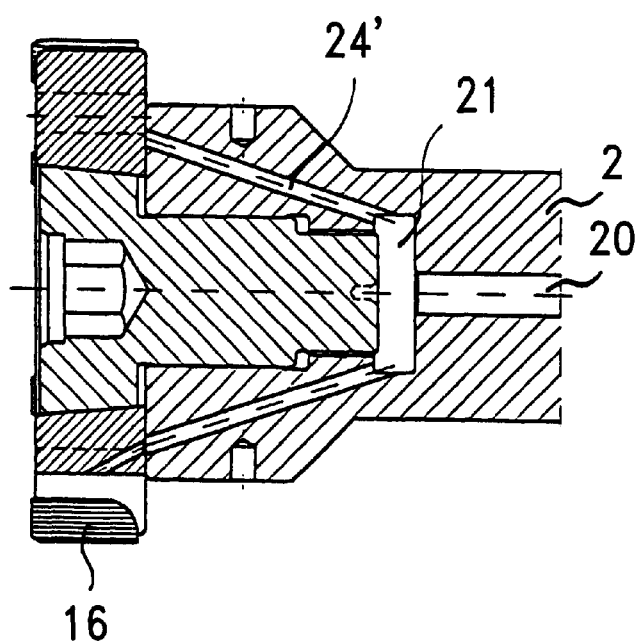
Figure 33:
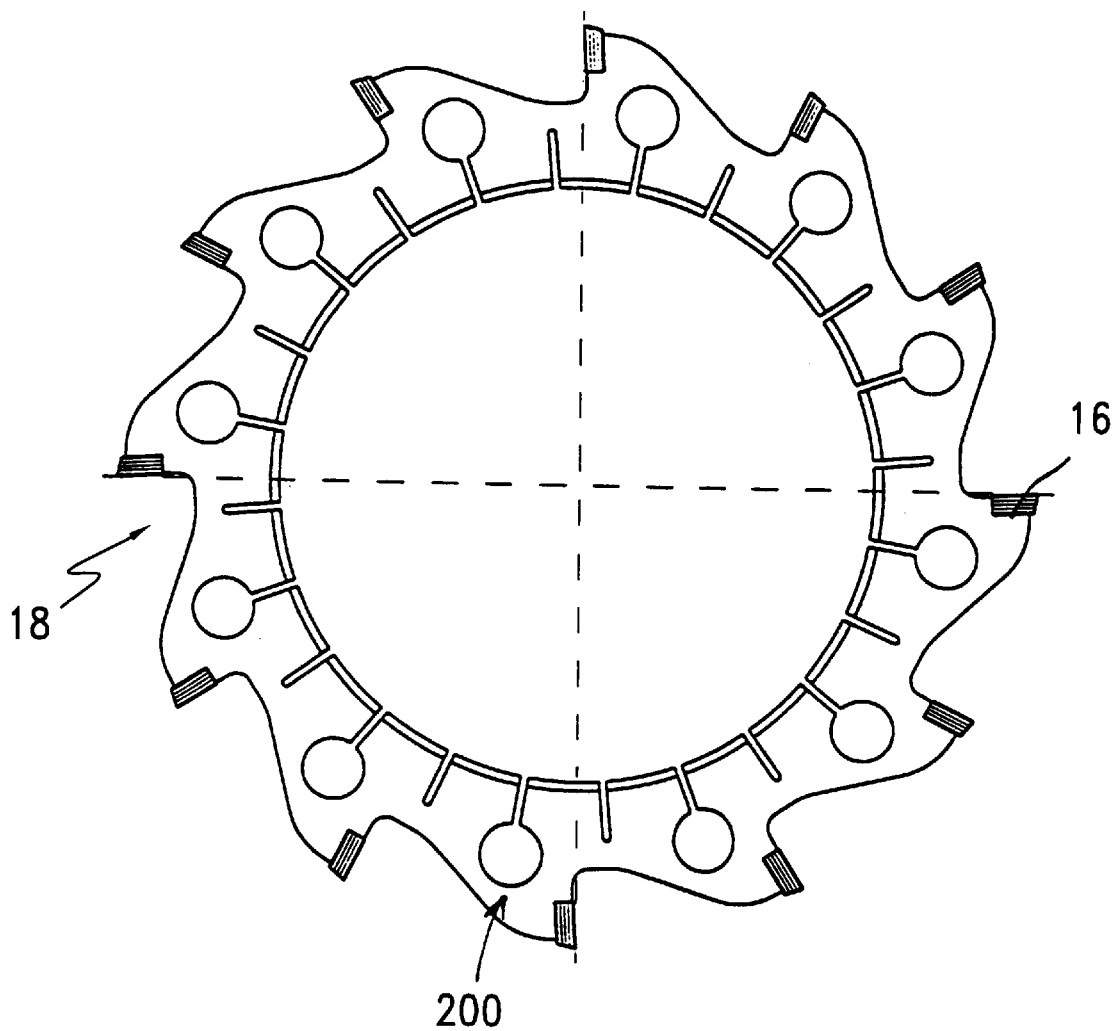

The invention will now be described in more detail with reference to a number of embodiments which are given by way of example and which are shown in the drawings. These serve solely to illustrate the invention and should not be taken to limit the spirit and scope of the invention which is defined in the appended claims. In the drawings:

FIG. 1A is an end view of a first embodiment of microfinishing tool according to the invention, of solid material with taper screw, one cutter and three guide ribs, FIG. 1B is an end view of a second embodiment of microfinishing tool according to the invention, of solid material with taper screw, one cutter and two guide ribs, FIG. 2A is an end view of a third embodiment of microfinishing tool according to the invention, with taper screw, one soldered cutter and three inserted guide ribs, FIG. 2B is an end view of a fourth embodiment of microfinishing tool according to the invention, with taper screw, one soldered cutter and two inserted guide ribs, FIG. 3A is an end view of a fifth embodiment of microfinishing tool according to the invention, with taper screw, expansion aid, one soldered cutter and three inserted guide ribs, FIG. 3B is an end view of a sixth embodiment of microfinishing tool according to the invention, with taper screw, expansion aid, one soldered cutter and two inserted guide ribs, FIG. 4A is an end view of a seventh embodiment of microfinishing tool according to the invention, of solid material with taper screw, two cutters and four guide ribs, FIG. 4B is an end view of an eighth embodiment of microfinishing tool according to the invention, with taper screw, two soldered cutters and four inserted guide ribs, FIG. 4C is an end view of a ninth embodiment of microfinishing tool according to the invention, with taper screw, expansion aid, two soldered cutters and four inserted guide ribs, FIG. 5A is an end view of a tenth embodiment of microfinishing tool according to the invention, of solid material with three cutters and three guide ribs, FIG. 5B is an end view of an eleventh embodiment of microfinishing tool according to the invention, with three soldered cutters and three inserted guide ribs, FIG. 5C is an end view of a twelfth embodiment of microfinishing tool according to the invention, with taper screw, three soldered cutters and three inserted guide ribs, FIG. 5D is an end view of a thirteenth embodiment of microfinishing tool according to the invention, with taper screw, expansion aid, three soldered cutters and three inserted guide ribs, FIG. 6A is a cross-section through a fourteenth embodiment of microfinishing tool according to the invention, with six cutters and taper screw, taken along the line A—A in FIG. 6B, FIG. 6B is a longitudinal section through the microfinishing tool of FIG. 6A, FIG. 7A is a cross-section through a fifteenth embodiment of microfinishing tool according to the invention, having three cutters, taper screw, expansion aid as well as three guide ribs, taken along the line A—A in FIG. 7B, FIG. 7B is a longitudinal section through the microfinishing tool of FIG. 7A, FIG. 8A is a cross-section through a sixteenth embodiment of microfinishing tool according to the invention, having three cutters, taper screw, expansion aid as well as six guide ribs, taken along the line A—A in FIG. 8B, FIG. 8B is a longitudinal section through the microfinishing tool of FIG. 8A, FIGS. 9 to 11 are respective longitudinal sections through seventeenth to nineteenth embodiments of microfinishing tool according to the invention, similar to FIGS. 6 to 8, but with differently defined contact surfaces for the achievement of defined pressure points, FIG. 12A is a cross-section through a twentieth embodiment of microfinishing tool according to the invention, having six cutters and taper screw with axially parallel cutter adjustment, taken along the line A—A in FIG. 12B, FIG. 12B is a longitudinal section through the microfinishing tool of FIG. 12A, FIG. 13A is a cross-section through a twenty first embodiment of microfinishing tool according to the invention, having three cutters, taper screw with axially parallel cutter adjustment, expansion aid as well as three guide ribs, taken along the line A—A in FIG. 13B, FIG. 13B is a longitudinal section through the microfinishing tool of FIG. 13A, FIG. 14A is a partial longitudinal section through a twenty second embodiment of microfinishing tool according to the invention with replaceable cutting head, FIG. 14B is a cross-section through the microfinishing tool of FIG. 14A, taken along the line A—A in FIG. 14A, FIG. 14C is a cross-section through the microfinishing tool of FIG. 14A, taken along the line B—B in FIG. 14A, FIG. 15 is a partial longitudinal section through a twenty third embodiment of microfinishing tool according to the invention, with replaceable cutting head, FIG. 16A is a partial longitudinal section through a twenty fourth embodiment of microfinishing tool according to the invention, with replaceable cutting head, FIG. 16B is a cross-section through the microfinishing tool of FIG. 16A, taken along the line A—A in FIG. 16A, FIG. 17A is a partial longitudinal section through a twenty fifth embodiment of microfinishing tool according to the invention, with replaceable cutting head, FIG. 17B is a cross-section through the microfinishing tool of FIG. 17A, taken along the line A—A in FIG. 17A, FIG. 17C is a cross-section through the microfinishing tool of FIG. 17A, taken along the line B—B in FIG. 17A, FIG. 18A is a partial longitudinal section through a twenty sixth embodiment of microfinishing tool according to the invention, with replaceable cutting head, FIG. 18B is a cross-section through the microfinishing tool of FIG. 18A, taken along the line A—A in FIG. 18A, FIG. 18C is a cross-section through the microfinishing tool of FIG. 18A, taken along the line B—B in FIG. 18A, FIG. 19 is a partial longitudinal section through a twenty seventh embodiment of microfinishing tool according to the invention, with replaceable cutting head, FIG. 20A is a partial longitudinal section through a twenty eighth embodiment of microfinishing tool according to the invention, with replaceable cutting head, FIG. 20B is a cross-section through the microfinishing tool of FIG. 20A, taken along the line A—A in FIG. 20A, FIG. 20C is a cross-section through the microfinishing tool of FIG. 20A, taken along the line B—B in FIG. 20A, FIG. 21A is a partial longitudinal section through a twenty ninth embodiment of microfinishing tool according to the invention, with replaceable cutting head, FIG. 21B is a cross-section through the microfinishing tool of FIG. 21A, taken along the line A—A in FIG. 21A, FIG. 22 is a partial longitudinal section through a thirtieth embodiment of microfinishing tool according to the invention, with replaceable cutting head, FIG. 23A is a partial longitudinal section through a thirty first embodiment of microfinishing tool according to the invention, with replaceable cutting head, FIG. 23B is a cross-section through the microfinishing tool of FIG. 23A, taken along the line A—A in FIG. 23A, FIG. 24A is an end view of a thirty second embodiment of microfinishing tool according to the invention, with six cutters and a taper screw, FIG. 24B is a partial longitudinal section through the microfinishing tool of FIG. 24A, FIG. 25 is an end view of a thirty third embodiment of microfinishing tool according to the invention, with six cutters, a taper screw as well as expansion aid, FIG. 26 is an end view of a thirty fourth embodiment of microfinishing tool according to the invention, with six cutters, a taper screw as well as expansion aid and six guide ribs, FIG. 27A is an end view of a thirty fifth embodiment of microfinishing tool according to the invention, with six cutters, a taper screw as well as expansion aid, FIG. 27B is a partial longitudinal section through the microfinishing tool of FIG. 27A, FIG. 28A is an end view of a thirty sixth embodiment of microfinishing tool according to the invention, with six cutters, a taper screw as well as expansion aid, FIG. 28B is a partial longitudinal section through the microfinishing tool of FIG. 28A, FIG. 29 is a longitudinal section through a thirty seventh embodiment of microfinishing tool according to the invention, with six cutters, a taper screw as well as expansion aid, FIG. 30 is a longitudinal section through a thirty eighth embodiment of microfinishing tool according to the invention, with six cutters, a taper screw as well as expansion aid, FIG. 31 is a longitudinal section through a thirty ninth embodiment of microfinishing tool according to the invention, with six cutters, a taper screw as well as expansion aid, FIG. 32 is a longitudinal section through a fortieth embodiment of microfinishing tool according to the invention, with six cutters, a taper screw as well as expansion aid, and FIG. 33 is an end view of a forty first embodiment of microfinishing tool according to the invention, with twelve cutters as well as expansion aid.

In the drawings, the respective same reference numerals are used for the same parts.

Reference is first made to FIG. 1A, which shows a first embodiment of a microfinishing tool according to the invention, which is a friction and sinking cutting tool of solid material (hard metal) comprising a shank 2, a taper screw 6, a cutting edge 16', a chip space 18 and three guide ribs 30'. The guide ribs 30' are arranged at angular spacings of 120° to each other. The cutting tool can be provided with and without internal cooling. One such form of internal cooling can comprise a central coolant channel and two or more coolant channels.

The second embodiment of FIG. 1B differs from the first embodiment only in the number and arrangement of the guide ribs 30'. These are here arranged opposite one another.

In the third embodiment illustrated in FIG. 2A and likewise equipped with one cutter, the cutter 16 is soldered in place and the three guide ribs 30 of for example hard metal are inserted in place. The tool shank 2 is for example of steel. FIG. 2B shows a variation with two oppositely disposed guide ribs 30, similar to FIG. 1B.

In FIGS. 3A and 3B are shown a fifth and sixth embodiment of microfinishing tool according to the invention respectively, which differ from the embodiments illustrated in FIGS. 2A and 2B in that an expansion aid is provided. In the illustrated embodiments, this consists of bores 200 which are closed by plastics plugs or are sealed by metal plugs for example. Instead of the bores 200 one could alternatively erode slots, possibly combined with bores. The purpose of the expansion aid is slightly to weaken the material which then permits a spreading of the cutting head to take place.

FIGS. 4A, 4B and 4C show end views of a seventh, eighth and ninth embodiment of microfinishing tool in accordance with the invention, with two cutters, corresponding to FIGS. 1A, 2A and 3A. These embodiments will therefore not be described in detail.

Correspondingly, FIGS. 5A, 5B, 5C and 5D show tenth to thirteenth embodiments of microfinishing tool according to the invention, each provided with three cutters. FIGS. 5A and 5B are analogous to FIGS. 1A and 2A. The embodiment of FIG. 5C has no expansion aid. The embodiment of FIG. 5D has an expansion aid which is different from that of FIG. 3A. It comprises a smaller bore 202 which is combined with an eroded slot 204.

Next, a fourteenth embodiment of microfinishing tool according to the invention, having six cutters and taper screw is described with reference to FIG. 6. The microfinishing tool comprises a shank 2, of which only the forward end is shown, which comprises at the forward end a portion 2a of enlarged diameter. The shank 2 has in its forward region a central end bore 4 with several sections, to receive a taper screw 6' having a forward tapered portion 6a', a cylindrical portion 6b' and a threaded portion 6c' as well as a hexagonal recess 6d' for a hollow screwdriver. By means of the cylindrical portion 6b' the taper screw 6' is a snug fit, and is centred. An inward screwing of the taper screw 6' leads to a gradual expansion of the shank 2 in the cutting region, and in this way the cutting diameter can be adjusted. In known manner, the shank 2 carries on the forward portion 2a inset diamond cutters 16 of hard metal, diamond or other suitable material, with associated chip spaces 18.

In FIG. 7B is shown a variation of the taper screw, in which the tapered portion 6a' is here divided into three sections $6^I$, $6^{II}$, $6^{III}$, each with different inclinations (not shown to scale). In this way, the adjustment of the cutting head can be carried out essentially in the desired cutting or contact region. By choice of a taper screw with different angles of taper, the pressure point can be located at a desired axial region of the cutter or guide rib depending upon the lengths of the cutter and guide rib. This will be described in more detail hereinafter with reference to FIGS. 9 to 11.

In the rearward portion of the shank 2 there extends an axial bore 20 for coolant and lubricant, extending in the direction towards the cutting head. Before reaching the end bore 4, the axial bore 20 divides into branch bores 22 which extend at an angle outwards and forwards. To the outside the branch bores 22 are closed off by stops 22a. At a radial distance from the shank axis, which is greater than the external diameter of the cylindrical sleeve 12, the branch bores 22 become coaxial supply bores 24 which are closed at their forward ends by stops 24a. In the illustrated embodiment, the coaxial supply bores 24 are each provided, approximately from the central region up to the forward region, with three discharge bores 26 which each issue into the chip space 18.

By this structure for the supply of the coolant and lubricant, the shank 2 is itself cooled in the cutting region by the coaxial supply bores 24. The coaxial arrangement of the supply bores 24 makes it possible to position the discharge bores 26 according to the requirements of the tool and to select their number as needed, so that the cutters can be effectively cooled by direct flushing, and indeed over a desired axial zone. Furthermore, the chip flushing and cleaning of the chip space can be optimised in this way according to the material of the workpiece.

The fifteenth embodiment of the microfinishing tool according to the invention shown in FIG. 7 has a cutter and guide rib configuration as in the fourteenth embodiment described above.

The microfinishing tool shown as a sixteenth embodiment of the invention in FIG. 8 differs from the fifteenth embodiment described above in the provision of further guide ribs 32 which are arranged offset axially rearwardly of each cutter 16.

Figure 9:
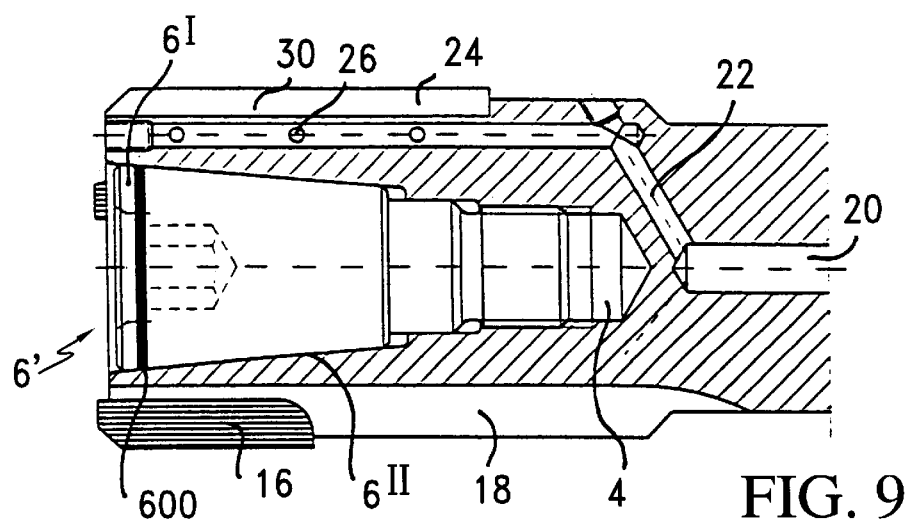

FIGS. 9 to 11 illustrate, in combination with FIG. 7, already described embodiments of a microfinishing tool according to the invention having taper screws, which are intended to show how the contact surfaces of the taper screws are differently arranged and formed for different embodiments of tool. The taper screws 6' of the here illustrated seventeenth to nineteenth embodiments have different inclinations which are provided for the required pressure regions, so that they have different diameters and axial dimensions. The pressure regions can thus be located at different diameters and axial positions of the taper screw and cause a defined adjustment of the cutters 16 with support ribs 30, 32. The diameters of the taper pressure points are matched to the machining needs. Thus, for short cutters, only one forward and possibly a second pressure point are provided, while for long cutters and guide ribs, for example up to four pressure points can be provided. This makes it possible that with long cutters and guide ribs these are pushed outwards elastically.

The pressure points result from an appropriate regional convex or concave shaping of the taper screw, so that one has the pressure rings or pressure points which cause an expansion, and pressure-free zones $6^I$, $6^{II}$, $6^{III}$, $6^{IV}$, which cause no expansion at these locations.

In the embodiment shown in FIG. 9, because of the short cutter and guide rib design, only one pressure point 600 is provided, almost right at the forward end of the taper screw 6'.

The embodiment of FIG. 10 has longer cutters 16 and guide ribs 30, and three pressure points 600, 602 and 604 are arranged spaced along the length of the taper screw.

Even more pressure points, namely four (600, 602, 604, 606), are provided in the embodiment of FIG. 11. Here the taper screw 6' is correspondingly longer.

The twentieth embodiment shown in FIG. 12 differs essentially from the embodiments described above in the design of the taper screw and correspondingly in how it is received in the shank 2 of the microfinishing tool. The central end bore 4 is enlarged to the depth of the cylindrical portion 6b of the taper screw 6 into a cylindrical receiving opening. The taper screw 6 has its conical portion 6a and the forward region of the cylindrical portion 6b received within a two-part sleeve insert 8 with inner wall and concave outer wall, where the forward portion 8a of the sleeve insert 8 is widened internally in tapered manner corresponding to the shape of the conical portion 6a of the taper screw, and the forward portion 8a and the rearward portion 8b are separated from one another by a gap 10. The width of the gap 10 corresponds approximately to the free region of the end bore 4 provided for the threaded portion 6c, i.e. the feed range of the taper screw for the axially-parallel fine-reaming of the cutting zone. The sleeve insert 8 is received within a cylindrical sleeve 12 with convex internal wall, which extends over its full length. The above-mentioned fine-reaming of the cutting zone is effected by the engagement with the middle curvature of the sleeve 12. If the taper screw 6 is screwed further inwards beyond the fine-reaming range, a more intense reaming of the cutting zone follows by the engagement of the forward taper. The rearward portion 8b of the sleeve insert 8 is aligned in the shank 2 by means of pins 14. This tool does not need to be further described and reference should rather be made to the foregoing description.

In FIG. 13 there is shown a twenty first embodiment of a microfinishing tool according to the invention. This comprises three cutters 16 and otherwise has substantially the same structure as the twentieth embodiment (the same type of taper screw). Additionally, three inserted guide ribs 30 of hard metal are provided, which extend over a greater part of the length of the cutting zone.

Furthermore, the central coolant bore 20 can even be bored through into the bore 4, where it is hermetically sealed by the snug fit of the region 6b'.

The microfinishing tool according to the invention is adaptable to various receiving systems, for example massive systems with cylinder shafts, practically all conventional and special receiving systems. In the following, several embodiments with replaceable cutting heads are described.

FIG. 14A shows a partial longitudinal section through a twenty second embodiment of a microfinishing tool according to the invention having a replaceable cutting head 100. The shank 2 has an axial coolant bore 20. At the forward end it has an internal bore 300 in which is seated the rod-shaped end 101 of the cutting head 100. In the cutting head are provided two longitudinal grooves 103 as supply bores 24' for coolant and lubricant. The rod 101 is held in the shank 2 by means of a fixing pin 105 for a bayonet connection 107.

The twenty third embodiment shown in FIG. 15 differs from the embodiment described above in that the central coolant bore 20 is taken further forwards and first branches into the supply bores 24' only shortly before the cutting head 100.

The embodiment illustrated in FIG. 16 is similarly constructed. Here, instead of a bayonet connection, the cutting head 100 is secured to the adaptor part by means of a securing pin 105.

In FIG. 17 there is shown a cutting head 100 which is provided with a key surface 109 at two oppositely disposed regions. The associated adaptor member or tool shank 2 is likewise provided with key surfaces 109. The cutting head 100 is screwed in (see 113). The internal cooling comprises a central coolant channel 20 and branching supply bores 24'.

In the twenty sixth embodiment which is shown in FIG. 18 the cutting head rod 101 is flattened in its end zone. The fixing in the shank 2 is effected again by means of a securing pin 105. The internal cooling is effected as in the immediately preceding embodiment.

In FIG. 19 there is shown an embodiment with two key surface areas 109, in which the cutting head 100 has a tapered end section 111 through which the central coolant bore 20 extends, before it branches into the supply bores 24'. The tapering section 111 causes a good centering of the cutting head in the shank 2.

The embodiment of FIG. 20 has a tapering centering and a pin fixing. The internal cooling is axial. Supply bores 24' are provided first in the cutting head 100. This is more economical from the manufacturing point of view.

In the embodiment of FIG. 21, again the supplies are provided as grooves 103 recessed into the rod section 101. A securing pin 105 is provided for the fixing and retaining of the cutting head 100 on the shank.

The cutting head shown in FIG. 22 includes a taper screw 6. For the rest the tool is the same as that of FIG. 20.

In the embodiment shown in FIG. 23, the grooves 103 are not in the rod section 101, but are recessed into the wall of the shank 2. Again, a securing pin is provided for the fixing.

In FIGS. 24 to 32 examples are shown of replaceable cutting heads. These are all provided with a taper screw 6 or a taper ring 6". In FIGS. 21 to 25, nuts 7 are screwed on as securing means, which during the screwing process by means of the taper cause the expansion of the cutting head and of its fixing. Centering pins 14 ensure the exact take-up of the cutting head. The internal cooling includes a central supply 20 through the shank 2. In FIG. 25 the pressure member and likewise the end of the shank are tapered, which has the effect of a clamping tongue.

In FIGS. 29 and 30 there is shown a stepped, partially tapered central pin 6''' by means of which the centering is effected. Its central cylindrical section is a snug fit, just as the above-mentioned cylindrical section 6b of the taper screw. Likewise, a threaded section is provided.

In the embodiments shown in FIGS. 31 and 32, the central coolant bore 20 terminates in a distribution ring 21 from which supply bores 24' run. As shown, a radial bore 115 can be provided for securing the central pin 6'''.

FIG. 33 shows an end view of a cutting head of a forty first embodiment of microfinishing tool according to the invention, having twelve cutters.

What is claimed is:

1. Microfinishing tool, particularly a reamer, comprising a shank (2) and at least one rigid cutter (16) as well as at least one guide rib (30) at the periphery and a taper screw (6), by means of which the cutting diameter is adjustable, characterised in that the taper region of the taper screw (6) is at least as long as the cutter (16) and the taper screw (6) has different pressure points (600, 602, 604, 604), and wherein the taper screw (6) has taper sections with different angles of the taper.

2. Microfinishing tool according to claim 1, characterised in that recesses (202, 204) are provided in the shank (2) as expansion aids.

3. Microfinishing tool according to claim 1 characterised in that the taper screw (6), following on from the threaded region (6a), has a cylindrical section (6b) which is a snug fit in the shank (2) of the tool.

4. Microfinishing tool according to claim 1 characterised in that a central axial coolant bore (20) for coolant and/or lubricant is provided in the shank (2) of the tool.

5. Microfinishing tool according to claim 4, characterized in that at least one branch bore (22) leads outwardly from the axial coolant bore (20) in its forward region, the branch bore (22) issues into a coaxial supply bore (24) which extends axially at least partially over the cutting region, and at least one discharge bore (26) leads from the or each coaxial supply bore (24) to the cutting region.

6. Microfinishing tool according to claim 4 characterised in that at least one discharge bore (26) is associated with the guide rib (30).

7. Microfinishing tool according to claim 5 characterised in that the or each coaxial supply bore (24) extends over the full length of the cutting region.

8. Microfinishing tool according to claim 5 characterised in that a plurality of axially offset discharge bores (26) are provided.

9. Microfinishing tool according to claim 1 characterized in that it has two, three or more cutters (16).

\* \* \* \* \*